Sept. 27, 1955           J. E. BEBINGER           2,719,011
WASTE DISPOSAL COMMINUTOR WITH ROTARY IMPELLER AND
STATIONARY RING OF SUCCESSIVELY DIFFERENTLY FACING
CUTTING AND ABADING ELEMENTS
Filed Dec. 28, 1953           2 Sheets-Sheet 2
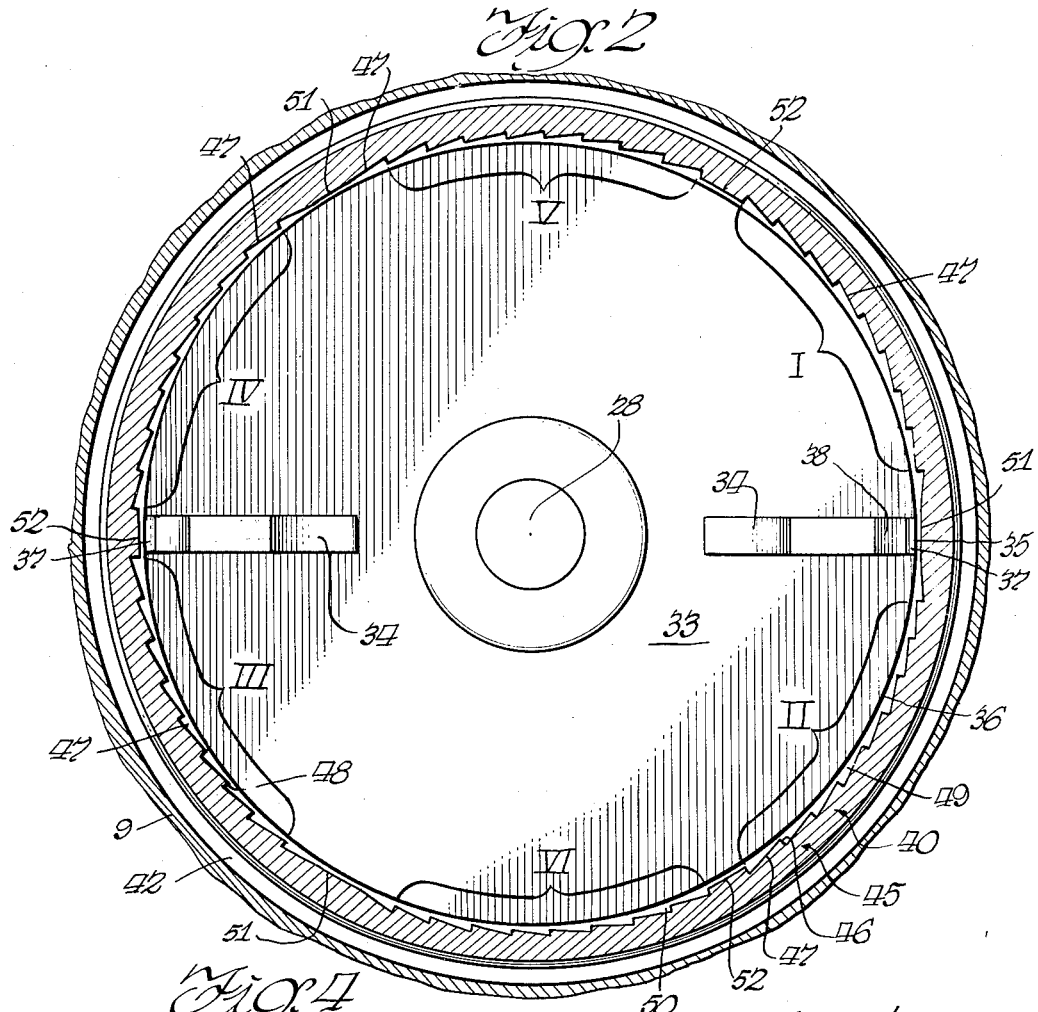
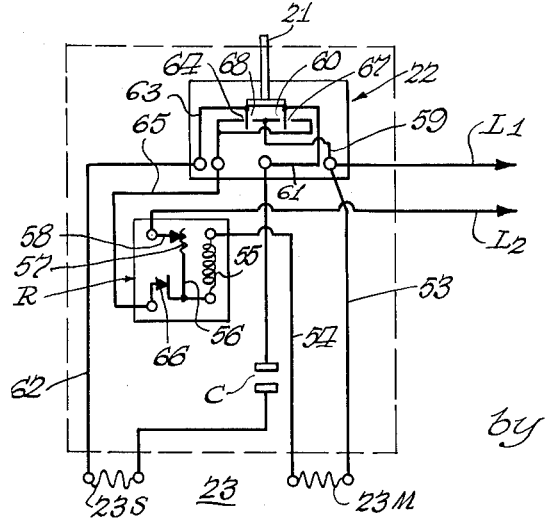
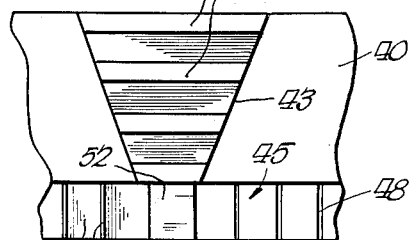
Inventor
Jack E. Bebinger
by Andrew L. Hubbard
Atty.

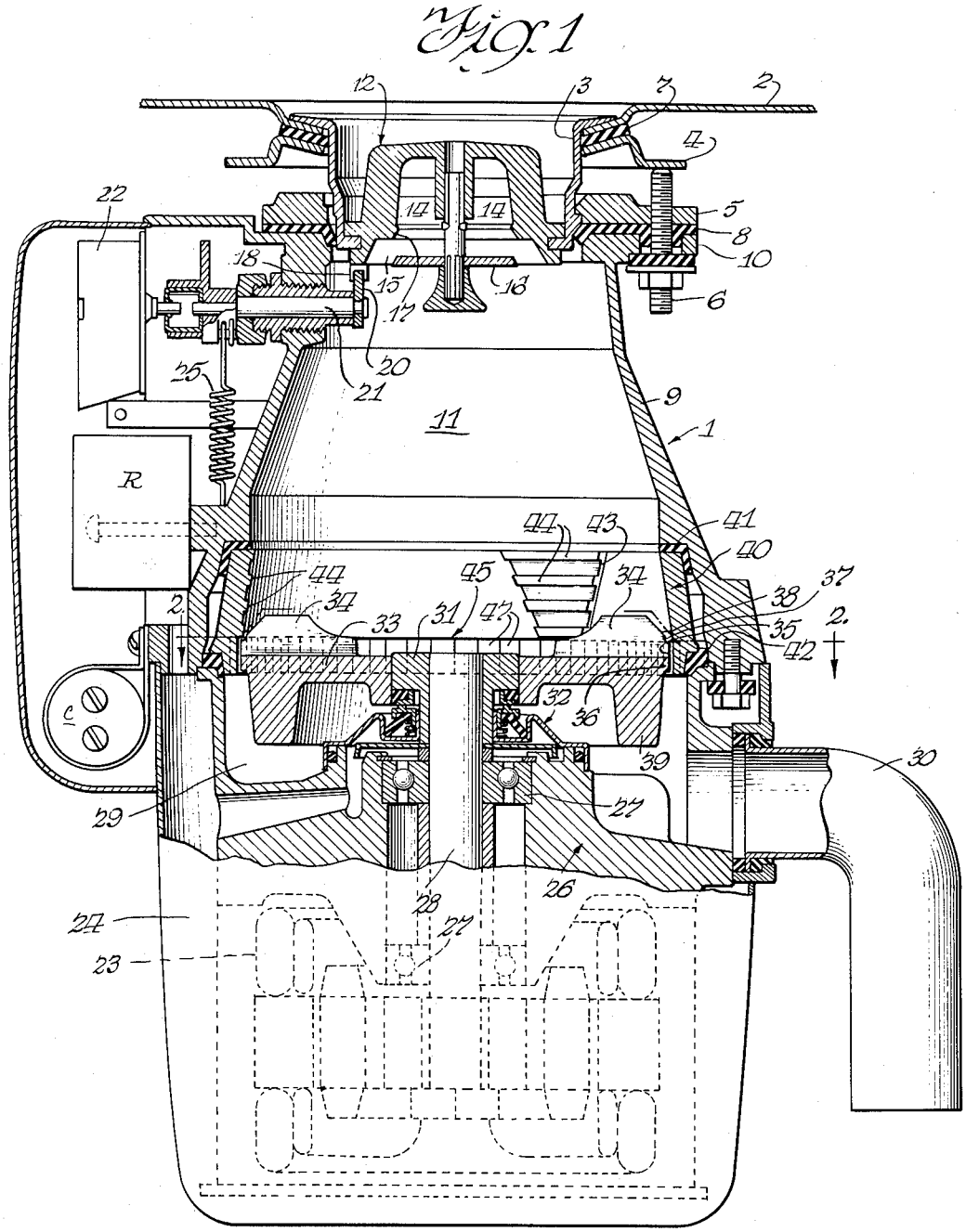

United States Patent Office 2,719,011
Patented Sept. 27, 1955

2,719,011

WASTE DISPOSAL COMMINUTOR WITH ROTARY IMPELLER AND STATIONARY RING OF SUCCESSIVELY DIFFERENTLY FACING CUTTING AND ABRADING ELEMENTS

Jack E. Bebinger, Brookfield, Ill., assignor to General Electric Company, a corporation of New York Application December 28, 1953, Serial No. 400,654

10 Claims. (Cl. 241—46)

This invention relates to food waste disposal apparatus, and, in particular, to improved means for reducing food waste to small particle size for discharge to a plumbing drain or the like.

Specifically, the invention relates to waste disposal apparatus having a housing arranged to form a comminution chamber having stationary cutting and abrading elements disposed about the lower wall thereof, and a disc-like impeller forming the bottom of the chamber and having impeller members arranged to propel the waste material against the stationary elements. Means are provided to establish a plurality of small passages communicating between the comminution chamber and a drainage chamber below the impeller; and when the apparatus is in operation in the presence of water, the slurry of waste particles and water flows into the drainage chamber and thence to the plumbing waste line connected thereto.

It is a main object of my invention to provide waste disposal apparatus of the above-noted type, having an impeller provided with a plurality of fixed radially extending impeller members in which no two of said elements may simultaneously be in the same operative relationship to any of the stationary cutting and abrading elements.

It is another object of the invention to provide waste disposal apparatus having several series of stationary elements providing cutting edges and abrading surfaces, and a rotatable impeller having a plurality of impeller members thereon, said fixed members and impeller members being so related that when one impeller member is propelling waste material forceably against cutting edges to cause said edges to cut or gouge the material, another member is propelling other portions of the waste material over another series of stationary elements in an abrading rather than a cutting relationship therewith.

It is yet another object of the invention to provide, in waste disposal apparatus having a reversible rotatable impeller and a plurality of stationary cutting and abrading elements, a relationship between said stationary elements and said impeller which will facilitate the clearing of jams between the impeller and the stationary elements.

It is a further object of my invention to provide an operating relationship between rotating impeller members and stationary cutting and abrading elements in a waste disposal machine which will reduce the possibility of overloading the impeller drive motor.

In a preferred embodiment of the invention, I provide a comminuting chamber having about its lower wall portion, a series of edged elements which are arranged to cut, gouge, and abrade waste material propelled thereagainst by members extending from the rapidly rotating impeller. The edged elements are arranged in groups, each group comprising a series of ridges having one wall substantially radial with respect to the axis of rotation of the impeller and a second wall extending from the first at a rather large angle thereto. In any one group of ridges, the said second walls extend in a uniform direction, as respects the direction of rotation of the impeller. In the immediately adjacent group, however, the second walls extend uniformly in the opposite direction. Thus, according to the direction of rotation of the impeller, food waste propelled by the impeller members against the radial wall of the edge forming structures will be cut, sheared, or gouged by the adjacent edge thereof, whereas material driven against a sloping wall will be crushed and abraded. The various groups of edged elements are arranged so that when one impeller member is driving the waste material against the radially extending walls, another impeller member is drawing waste material along the angularly extending walls of a remote group. In this fashion, the total load on the motor is less than in present constructions in which all impeller members are in substantially the same cooperative relationship with the fixed shredding elements and are, therefore, in a position to multiply the load on the impeller drive motor by a factor equivalent to the number of such impeller members.

Other features and advantages will be apparent from the following detailed description of a presently preferred embodiment, read together with the accompanying drawings in which:

Fig. 1 is a side sectional elevation of waste disposal apparatus embodying the impeller and fixed shredding element construction of the present invention;

Fig. 2 is a top plan view of the impeller and the edge-forming portion of the shredding ring taken in section along lines 2—2 of Fig. 1;

Fig. 3 is an elevational detail of the shredding ring showing presently preferred forms of the stationary cutting and abrading elements; and Fig. 4 is a schematic wiring diagram for the control of the reversible drive motor.

Referring first to Fig. 1, the waste disposal apparatus 1 is arranged to be supported from a kitchen sink 2 which, of course, is equipped with a cold water faucet (not shown). Specifically, the apparatus comprises the sink drainage opening collar 3, having the now conventional means such as flanges 4 and 5, bolts 6, and gaskets 7 and 8 by means of which the waste disposal apparatus is fixed to the sink in water tight relation therewith. The upper housing 9 has a mounting flange 10. Said housing wall extends outwardly and downwardly to define the comminution chamber 11 within which the waste material (not shown) is placed. Waste materials for disposition may be placed in chamber 11 after the removal of the combined stopper and switch actuator 12. As is now well known, the comminution of waste is carried out in the presence of water; and with the actuator 12 in its operative waste disposal position (as shown), water from the sink faucet will pass through the openings 14 and through the annular passage 15 into the chamber. To permit the sink to be used for normal purposes, the actuator 12 may be removed, inverted, and returned to the collar 3, whereupon the valve disc 16 will seat by gravity on the valve seat 17, and the actuator will function as a conventional sink stopper.

When the chamber has been loaded with waste for disposal, the actuator 12 is inserted, as shown, and rotated; whereupon a cam 18 projecting therefrom will engage a follower 20 on a switch shaft 21 and rotate said shaft through an arc. Shaft 21 is operatively connected to a double throw, double pole switch 22, arranged to complete an electric power circuit to the drive motor 23 within the motor housing 24 at the base of the disposer 1. A suitable reversing switch is the indexing type automatic reversing switch sold under catalog number D–12170a by Soreng Manufacturing Company of Schiller Park, Illinois. A spring 25 returns the switch to a neutral position whenever the cam 18 is retracted from the follower 20. It is sometimes the practice to install in water-flow operated switch (not shown) in the cold water line leading to the faucet. Said switch is in series in the power circuit and must be closed by the action of a predetermined rate of flow of water in the line before the motor 23 will be energized.

None of the foregoing comprises a part of the present invention; similar and fully equivalent constructions are well known in the art and are disclosed in the presently pending application of Thomas H. Swisher, Serial No. 229,215, filed May 31, 1951, now Patent 2,669,395, granted February 16, 1954, for "Kitchen Waste Disposal Apparatus With Reversing Means" and assigned to my present assignee.

The rigid structure 26 fixed about the bottom of the housing 9 provides a support for the motor 23 and bearings 27 for the motor shaft 28. It also comprises an annular drainage chamber 29, to the lowermost portion of which is attached a waste outlet fitting 30 intended for connection to a waste trap (not shown) of the plumbing system.

The upper end of shaft 28 has fixed thereto a fitting 31 which is arranged to carry a liquid seal 32 of any suitable construction so as to prevent passage of liquid along the motor shaft 28 or in any other way into the motor 24.

A rotatable impeller 33 is suitably rigidly mounted on the fitting 31 to be driven thereby in the direction of rotation of the motor. Although not essential to the present invention, I prefer to construct the impeller in the form of a substantially plane-surface disc having the relatively narrow, diametrically opposed impeller members 34. Said impeller members comprise rigid members of substantial strength. As illustrated, they have a forward wall portion 35 extending upwardly from the rim 36 of the impeller 33. The intersection of the side faces of the impeller members with the forward wall portion thereof is at a sharp angle to provide relatively sharp edges. Above said wall portion 35 the forward wall of the members 34 advantageously extends concavely upward at 37 and then angularly upward as at 38. In order for the impeller better to function as a flywheel for the motor, it is given appropriate mass by the annular rim 39. The entire impeller may advantageously be formed of a cast alloy of iron, chromium and nickel, with the fitting 31 being of machined steel.

The fixed comminution element 40 is suitably mounted in the illustrated upper and lower resilient gasket rings 41 and 42 to constitute the lowermost wall portion of the comminution chamber. Element 40 is designed to cut, gouge, shred, and abrade the waste material driven thereagainst by the rotating impeller, and, for convenience, will be referred to hereinafter as in the claims as a "shredding ring." Said shredding ring 40 may advantageously be a casting having a frusto-conical shape, although it is known in the art to form shredding rings from sheet metal cylinders. In the cast form of ring, illustrated, it is formed with a plurality—illustratively three—of primary shredding elements 43. Such elements may comprise trapezoidal bosses on the wall of the ring which have been machined to provide the sharp edged ridges 44. The trapezoidal shape of the bosses is primarily to facilitate removal of the pattern from the sand mold. With other methods of manufacture, the side walls of the bosses could be straight or have any other desired relationship. Similarly, the fact that the grooves are horizontally extending results from manufacturing expediency.

As clearly indicated in Fig. 1, the elements 43 are arranged about the shredding ring 40 to eliminate the possibility of both of the impeller members 34 coming into operative relationship with an element 43 at the same time. With the impeller having two diametrically arranged impeller members, there should therefore be an odd number of elements 43 equiangularly spaced about the shredding ring. Below the elements 43, the shredding ring is formed with groups of notch-like cavities in the wall of the ring to provide a plurality of cutting and abrading elements 45. Each such cavity is defined by a radially extending wall 46 and an angular wall 47, the latter extending from the radially innermost edge 48 of one wall 46 to the base of said wall of a next succeeding cavity, as best shown in Fig. 2. The walls 46 are preferably perpendicular with respect to the plane of the impeller 33. In order to insure concentricity with respect to the axis of rotation of said impeller, and also to insure that the edges 48 are relatively sharp, I prefer to take a machining cut around the base of the shredding ring. As appears in Fig. 3, this machining cut may result in flats of more or less haphazard width extending for the full vertical height of the edges 48. There are preferably two groups of said elements 45 between each pair of elements 43, each group being equal in number.

It will be noted from Fig. 1 that the rim 36 of the impeller 33, as well as the forward wall portion 35 of each impeller member 34, has a clearance fit with respect to the adjacent edge 48. That is to say, there is a relatively small but finite clearance 49 between the impeller and the edges 48; and as thus shown in Figs. 1 and 2, the cavities provide the multiplicity of passages 50 communicating between the comminuting chamber above the impeller 33 and the drainage chamber 29 below said impeller. The area of each said passage 50 is small when it is considered that each wall 46 is only of the order of one-sixteenth of an inch, or less, in radial measurement, whereas the length of wall 47 is several times that. The walls 46 and 47 comprehend an angle of from 75 to 80 degrees. Thus, the spaces 50 and the clearance 49 between the impeller and the edges 48 establish the maximum size of the particles which can pass from chamber 11 into the drainage chamber 29.

Assuming now that chamber 11 has received a quantity of waste material for disposal and cold water is flowing into the chamber, the switch actuator 12 is operated to rotate the switch shaft 21 to an "on" position. As indicated in Fig. 4, this will energize the main winding 23M through a circuit including line conductor L1, conductors 53, 54, relay coil 55 of a conventional starting relay R, conductor 56, heating coil 57 of a conventional overload component of the relay, closed contact 58 thereof, and line conductor L2. The start winding 23S will be energized in the circuit comprising line conductor L1, conductor 59, contact 60 of the double pole switch, the switch blade, conductor 61 to capacitor C, winding 23S, conductors 62 and 63, contact 64 of the switch, the second switch blade thereof, conductor 65, closed contact 66 of relay R, thence through closed contact 58 of the overload protection device to the line conductor L2. It will be assumed that the motor will then operate to rotate the impeller 33 clockwise of Fig. 2. If the switch shaft 21 operated switch 22 to a position in which the switch blades closed against contacts 67 and 68 thereof, (it will be remembered that a switch of the indexing type will effect a different operation of the switch for every operation of shaft 21 from an "off" to an "on" position) start winding 23S would have been energized in the opposite direction and the motor would have started in the counterclockwise direction, as is well understood.

During clockwise rotation of the impeller, the mass of waste will be propelled in a clockwise direction; and as the motor comes quickly up to speed, the mass is thrown outwardly and in the direction of rotation by the impeller itself and the impeller members 34. An important feature of this invention is the improbability of each impeller member simultaneously driving waste material against a radially extending wall 46 and thereby loading the motor by a factor substantially equal to the number of impeller members. As fully appears in Fig. 2, diametrically opposite cutting elements 45 have a different wall relationship; the sloping walls 47 of the upper right-hand group I of said cutting elements extend radially inward as considered in respect to clockwise rotation of impeller 33, whereas the walls 47 of the adjacent lower right-hand group II slope radially outward. In the lower left-hand group III diametrically opposite to group I, the walls 47 of the cutting elements 45 extend outwardly and the walls 47 of group IV extend inwardly rather than outwardly as in group II. This relationship exists also between the top group V, and the bottom group VI. It will be observed also that the shredding ring wall divisions between groups of elements 45 are also established in a similar manner. Wall division 51 between groups I and II, for example, is characterized by sloping side walls, whereas the diametrically opposite wall division 52 has radial side walls. This relationship prevails throughout the shredding ring structure.

When the heterogeneous collection of food waste is placed in the comminution chamber prior to the operation of the apparatus, most of it collects in the center portion of the impeller 33, because of the small diameter of the inlet fitting 3 relative to the diameter at the base of chamber 11. As impeller 33 begins to rotate the waste matter in the direction of rotation by the impeller members 34 material lying adjacent group II is driven forceably against the radial edges 46 of cutting elements 45 and will be cut and gouged thereby, whereas material lying against group IV is abraded and crushed by being dragged across the sloping walls of the elements 45 of that group. It will be observed that because of the short radial length and the distance between successive radial walls 46, the slope of walls 47 is not large. Said walls 47 therefore offer little resistance to the passage of waste material thereover. The spacing between the forward wall 35 of the impeller members 34 and the radially outermost ends of the walls 47 is small. Only a small mass of waste material can be trapped within the cavities which form the elements 45, and the crushing effort exerted by the walls 35 and 47 as the impeller member traverses a wall 47, imposes very little load on the drive motor. In this connection, it will be noted that the walls 35 of the impeller members are preferably not materially wider than the spacing between the radial walls 46, so as to limit any crushing action to the frontal area of a wall 47.

As the load on the respective impeller members 34 builds up in the sense that these members are pushing before them a relatively large volume of material, it is possible that a condition may be established in which each of the members is at the same time pushing material against the radial walls 46 of the elements 45 of one group and against the sloping walls 47 of the elements of an advance group. Walls of the elements 45 in advance of the impeller members at any instant exert only minor effort as respects comminution of the material. The main portion of the load imposed upon each of the impeller members therefore comprises the reaction and resistance to movement offered by the element 45 immediately in front of an impeller member. However, by increasing the peripheral length of the respective division wall structures 51 and 52, the shredding ring can be arranged so that all or a major part of the waste material being moved by the impellers will disengage from one group of elements 45 before coming into operational association with the next group of said elements.

Large objects such as bones and corn cobs will be tumbled upwardly against the overhanging cutting and abrading elements 44 by the impeller members of the impeller. As these waste materials begin to reduce in size, the sloping walls 38 of the impeller members throw the waste forwardly and upwardly against the elements 44.

It follows, therefore, that there is much irregular and violent motion of the waste materials within the comminution chamber. Members 34 rarely maintain control over any one piece of waste for more than a fraction of a revolution. The walls 47 of the elements 45 are deflection surfaces which tend to repel and throw back waste particles which are still too large to pass into the chamber 29. In the illustrated construction, many large diameter pieces of waste will be prevented, by the inward slope of the wall of the shredding ring, from engaging the walls 46 or 47 to any appreciable extent. Such pieces will be driven against the edge walls of the element 43 and chipped and tumbled thereby. Material on the surface of the impeller 33 between the impeller members is thrown outwardly against the elements 45 with varying amounts of force depending on the kinetic energy developed in the waste material. The relationship of the concave portion 37 of the impeller members to the lowermost edge of the adjacent shredding element 43 provides relief immediately below the shredding elements as the impeller member traverses it.

During the continuous movement and interchange of position of the waste material with respect to the comminution facilities within the chamber 11, the small particles of waste and the chips and shreds which result from the attrition of larger objects come increasingly within the operational scope of the elements 45 and eventually are reduced thereby to a size which will flush through the passages 50.

Occasionally a bone splinter or other hard object may become jammed so tightly between an impeller member and a wall 46 or 47 of one of the elements 45 that the motor may stall. For example, a jamming condition may develop when an impeller member is driving before it a hard bone or the like. If the bone becomes lodged between the leading side wall of the impeller member and the radial wall 46 of the adjacent element 45, the available motor power may not be enough to cut or snap the offending article and the motor will stall. By reversing the motor, however, the sloping wall 47 of the element 45 will cam the bone sliver radially inwardly of the impeller member and the jam will be cleared. Although in such a circumstance the reversal of the motor will abruptly place the opposite impeller member under operating conditions in which it is moving against the radial walls 46 of its adjacent group of elements 45, the motor will not be heavily loaded by such transition because there is inevitably a void, or at least a low concentration of material, to the rear of the impeller member. Thus, although the operating conditions of the respective impeller members appear merely to transfer from one to the other upon reversal of the motor, the load on the motor at the start of the reversal operation is actually very light, permitting the impeller quickly to gain operational speed.

A substantial advantage of the present arrangement of the elements 45 derives from the fact that when one of the impeller members is driven against the radial edges 46, the opposite member is operating against the gradually sloping walls 47, and the load on the drive motor is lower than in usual constructions in which all impeller members may equally add to the motor load. This construction permits the use of lighter and less powerful motors if desired, and, in any event, gives the drive motor a greater reserve capacity to break through a potential jamming condition.

While there has been described what is at present considered to be the preferred embodiment of the invention, it will be understood that various modifications may be made therein, and it is intended to cover in the appended claims all such modifications as fall within the true spirit and scope of the invention.

I claim:

1. Apparatus for the comminution of material, including a housing defining a comminution chamber having an opening in its upper end through which to receive said material and water; a ring-like stationary shredding ring supported by said housing to provide a lower wall portion of said chamber, said shredding ring having a diameter substantially greater than said opening; a rotatable impeller mounted for rotation on an axis concentric with a lower wall portion of said shredding ring and having a rim in running clearance with said lower wall portion; said shredding ring having in said lower wall portion a plurality of cavities forming groups of substantially vertical, saw-tooth like cutting elements, said cavities being arranged to provide a series of said cutting elements facing in one direction and an immediately adjacent series facing in the opposite direction, with no diametrically opposite elements facing in the same direction; a drainage chamber disposed below said comminution chamber, passage means defined by said impeller rim portion and the walls of said cavities communicating between said comminution chamber and said drainage chamber; and a motor for selectively driving said impeller in one or another direction.

2. Apparatus for the comminution of material, including a housing defining a comminution chamber having an opening in its upper end through which to receive said material and water; a shredding ring supported by said housing to provide a lower wall portion of said chamber; a rotatable impeller mounted for rotation on an axis concentric with a lower wall portion of said shredding ring and having an outer rim having a running clearance with said lower wall portion; a drainage chamber below said impeller; said shredding ring device having a plurality of notch-like cutting elements comprising equidistantly spaced, very short, radial walls interconnected by an angularly extending wall several times greater in length, the angular walls of each of one series of cutting elements extending uniformly outwardly, considered in respect to a direction of rotation of said impeller, and the angular walls of each of the next succeeding series of cutting elements extending in the opposite direction, and there being no diametrically opposite cutting elements having angular walls extending in the same relative direction; the walls of said notch-like cutting elements and the adjacent rim of the impeller defining passages between the respective chambers; and a motor for rotating said impeller.

3. Apparatus according to claim 2, in which said shredding ring has wall means separating the respective series of cutting elements, said separating wall means being arranged in diametric opposition about said comminution device; diametrically opposed separating wall means being characterized, respectively, by radially extending side wall members and by angularly extending side wall members.

4. Apparatus according to claim 2, in which the radially extending wall portions of said cutting elements are parallel to the axis of rotation of said impeller.

5. Apparatus according to claim 2, in which said impeller has a plurality of fixed impelling members the radially outermost walls of which are in vertical alignment with the rim portion of said impeller and are parallel to the vertically extending wall portion of said cutting elements.

6. Apparatus for the comminution of material, including a housing defining a comminution chamber adapted to receive water and material to be comminuted, the lower portion of said chamber comprising a substantially cylindrical comminution device; a rotatable impeller mounted for rotation on an axis concentric with said comminution device and having a rim in running clearance with the lower portion thereof; rigid members fixed to said impeller and extending to the rim thereof; said comminuting device having a succession of notch-like cutting elements comprising a single, very short, radially extending wall and a much longer wall extending angularly therefrom, said cutting elements extending substantially entirely about said comminution chamber and being so related to the impeller members of said impeller that no two of said members can simultaneously drive material forwardly against a radially extending wall of said cutting elements; a drainage chamber below said impeller; means including said notch-like cutting elements providing communication between said chambers; and means for rotating said impeller.

7. Apparatus according to claim 6, in which said impeller members have a radially outer wall comprehending the full extent of the notch-like cutting elements above the rim of the impeller, and being in parallel relation with the immediately adjacent wall portions of said cutting elements.

8. Apparatus for the comminution of waste material, including a housing defining a comminution chamber adapted to receive waste material and water, the lower portion of said chamber comprising a circular wall structure providing a stationary comminution device; a rotatable impeller mounted for rotation on an axis concentric with said comminution device and having a rim in running clearance with the lower portion thereof, said impeller having a plurality of rigid members extending substantially radially to the rim thereof; said comminution device having a succession of notch-like cutting elements facing inwardly of said chamber about substantially the full circumference of said comminution device and disposed to be swept by the impeller members; each said cutting element comprising a single, short, radially extending wall and a much longer wall extending angularly therefrom, the angular wall of certain of said cutting elements extending outwardly, considered in respect to a direction of rotation of said impeller, and the angular wall of other of said cutting elements extending in the opposite direction, said cutting elements being arranged about the comminuting device in such manner that no two of said impeller members will be confronted by an angular wall extending in the same relative direction; a drainage chamber below said impeller; means including said cutting elements providing passage means between said chambers; and means for rotating said impeller.

9. Apparatus as in claim 8, in which said cutting elements occupy a cylindrical wall portion of said comminution device and the portion of said device above said elements is frusto-conical.

10. Apparatus as in claim 8, in which said radial impeller members have a front wall substantially equal in width to the projected width of said angularly extending walls of said cutting elements.

References Cited in the file of this patent

UNITED STATES PATENTS

| | | |
|---|---|---|
| 2,565,322 | Powers | Aug. 21, 1951 |
| 2,656,985 | Backlund et al. | Oct. 27, 1953 |
| 2,669,395 | Swisher | Feb. 16, 1954 |